United States Patent [19]

Lawrence et al.

[11] 4,279,117
[45] Jul. 21, 1981

[54] COMBINED CLUTCH AND BRAKE ARRANGEMENT FOR A ROTARY LAWNMOWER BLADE

[75] Inventors: Randall K. Lawrence, Fairview; Aaron A. Stevens, Spring Hill, both of Tenn.

[73] Assignee: The Murray Ohio Manufacturing Co., Brentwood, Tenn.

[21] Appl. No.: 116,970

[22] Filed: Jan. 30, 1980

[51] Int. Cl.³ .............................................. A01D 69/10
[52] U.S. Cl. ................................... 56/11.3; 192/17 R; 192/105 CF
[58] Field of Search .............................. 56/11.3, 10.5; 192/17 R, 17 A, 17 C, 17 D, 103 B, 105 CF

[56] References Cited

U.S. PATENT DOCUMENTS

| 1,811,974 | 6/1931 | Searle | 192/103 B |
| 2,954,109 | 9/1960 | Jardine | 192/105 CF |
| 2,999,574 | 9/1961 | Dodge | 74/336 B |
| 3,228,498 | 1/1966 | Zahradnik | 192/105 CF |
| 3,724,622 | 4/1973 | Barbulesco et al. | 192/103 B |
| 4,044,533 | 8/1977 | Wick | 192/17 R |
| 4,226,312 | 10/1980 | Zindler | 192/17 R |

Primary Examiner—Robert A. Hafer
Attorney, Agent, or Firm—Cushman, Darby & Cushman

[57] ABSTRACT

A pair of centrifugally movable shoes are pivotally mounted to a mower blade support. Drive bands are supported by the respective shoes and are positioned so as to be engageable with a source of rotational movement whereby such movement is translated to the blade by the bands, the shoes and the blade support. A brake band selectively engages the shoes to decelerate them thereby braking the blade. Additionally, engagement of the brake band with the shoes moves the latter in opposition to the centrifugal force applied to the shoes during rotation. This results in the drive bands being moved out of engagement with the rotational source.

6 Claims, 3 Drawing Figures

COMBINED CLUTCH AND BRAKE ARRANGEMENT FOR A ROTARY LAWNMOWER BLADE

BACKGROUND OF THE INVENTION

A desirable feature of a rotary lawnmower is the provision of a control for the rotation of the mower blade which combines the features of selectively clutching the blade to the mower's power source and of braking the blade when it is declutched.

Examples of prior arrangements for accomplishing this type of operation are disclosed in U.S. Pat. No. 4,044,533, which was granted on Aug. 30, 1977 in the name of Gerald H. Wick. In such known mechanisms, clutch shoes are arranged to respond to spring and centrifugal forces to move into engagement with a clutch drum. This contacting relationship completes a path from a rotating source to the mower's blade. A brake band is provided which, when it is actuated, separates the clutch shoes and the drum to interrupt the drive path while simultaneously stopping the rotation of the blade.

Arrangements of the type just described suffer the deficiency that as the device is used, wear occurs on the clutch shoes which eventually results in a somewhat difficult and expensive repair operation to replace such shoes.

SUMMARY OF THE INVENTION

The deficiency just described is overcome in accordance with the present invention wherein inexpensive, easily changeable bands are utilized to interconnect a rotating power source with a mower blade. More particularly, an arrangement is provided wherein a pair of shoes are pivotally mounted to means which support the blade. Drive bands associated with the shoes are located proximate a rotating member whereby when the bands are brought into engagement with said member, rotation is translated to the shoes and to the blade. The resultant centrifugal force applied to the shoes increases the frictional engagement of the bands with the rotating member. Additionally, the rotating member tends to wrap the bands around itself. The result of this action on the shoes and the bands is an increase in the driving torque. A brake band is positioned to selectively engage the shoes so as to decelerate them while simultaneously displacing the shoes in opposition to the centrifugal force thereon. As a result, the drive bands are moved out of engagement with the rotating member so as to declutch the blade as it is braked.

DETAILED DESCRIPTION OF THE INVENTION

The invention now will be described in detail with reference to the accompanying drawings, wherein.

Figure 2:
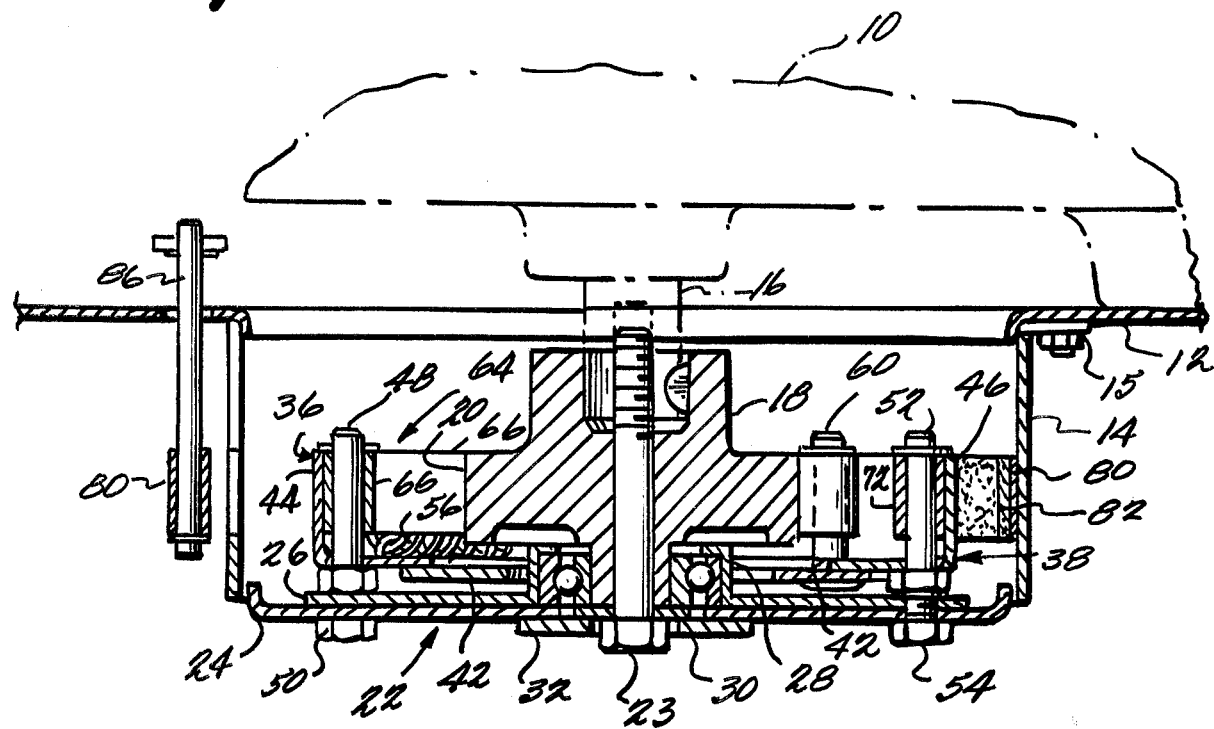
FIG. 2 is a view in section thereof taken along line 2—2 of FIG. 1.
Figure 3:
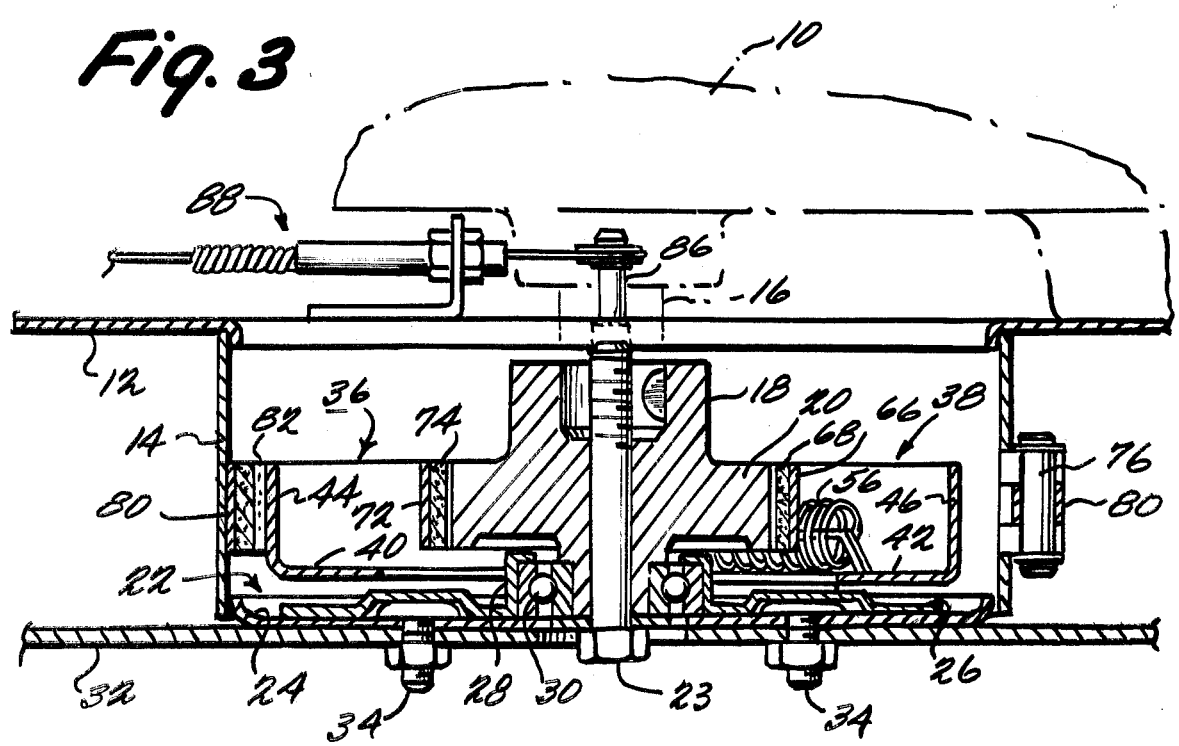
FIG. 3 is a view in section thereof taken along line 3—3 of FIG. 1.

Referring now to the drawings, the combined clutch and brake arrangement is supported beneath a rotary lawnmower, the motor 10 and blade housing 12 of which are generally indicated in FIGS. 2 and 3. A casing 14 extending downwardly from blade housing 12 surrounds the moving portions of the clutch and brake arrangement. The casing is joined to housing 12 by suitable fastening means, such as the engine mounting bolts, passing through mounting tabs 15 on the casing.

A drive shaft 16 extends downwardly from motor 10 within the confines of casing 14, and a drive disk 18 is keyed to the end of shaft 16 in order to rotate therewith. The disk 18 includes an annular flange portion 20 intermediate its ends which serves as a drive surface in a manner which will be described hereinafter.

A pan 22 (FIGS. 2 and 3) is secured to the shaft 16 in order to be supported thereby. This is accomplished by means of a bolt 23 which passes through the pan and the drive disk 18 which is coaxial with the axes of rotation of the shaft and the disk. The threaded end of the bolt is received within an interiorly threaded borehole in the lower end of shaft 16. The pan 22 is formed by a lower plate 24 which is integrally connected to an upper plate 26 in a manner hereinafter to be described. The latter is provided at its central portion with an upwardly directed flanged collar 28 adapted to receive and retain a ball bearing assembly 30 between the drive disk 18 and pan 22. The bearing assembly 30 has its outer race retained between plates 24 and 26, while the inner race is secured to drive disk 18. This arrangement permits relative rotation between the disk and the pan.

A mower blade 32 is joined to pan 22 by conventional securing means 34 having ends welded to plate 24 and located within recesses between plates 24 and 26.

A pair of shoes 36 and 38 are positioned within casing 14. Each shoe comprises a flat base portion, 40 and 42, respectively, lying in planes parallel to pan 22 and a flange portion, 44 and 46, respectively, located along the outer peripheries of the base portions and extending normal to the planes of the base portions and pan 22. The shoes 36 and 38 are formed with a generally C-shaped configuration as viewed in FIG. 1, and they are positioned on opposite sides of drive disk 18. One end of shoe 36 is pivotally secured to pan 22 by means of a post 48 which is threaded at its lower end to receive a pair of nuts 50 which are separated by the pan. In this manner, the plates 24 and 26 are joined together. The post 48 passes upwardly from the pan through an aperture in the base portion 40 of shoe 36 to provide the pivotal support for the shoe. On the opposite side of drive disk 18 from post 48, shoe 38 is pivotally joined to pan 22 by similar means. More particularly, an upwardly projecting post 52 is secured at its lower end to pan 22 by double nuts 54 engaging a threaded portion of the post. Post 52 passes through an aperture in the base portion 42 of shoe 38, and as is partially accomplished by nuts 50, the plates 24 and 26 are held together by nuts 54. The shoes 36 and 38 are interconnected at their adjacent ends by means of compression springs 56 and 58 joined to the shoes in a conventional manner. The purpose of these springs will be explained hereinafter.

Figure 1:
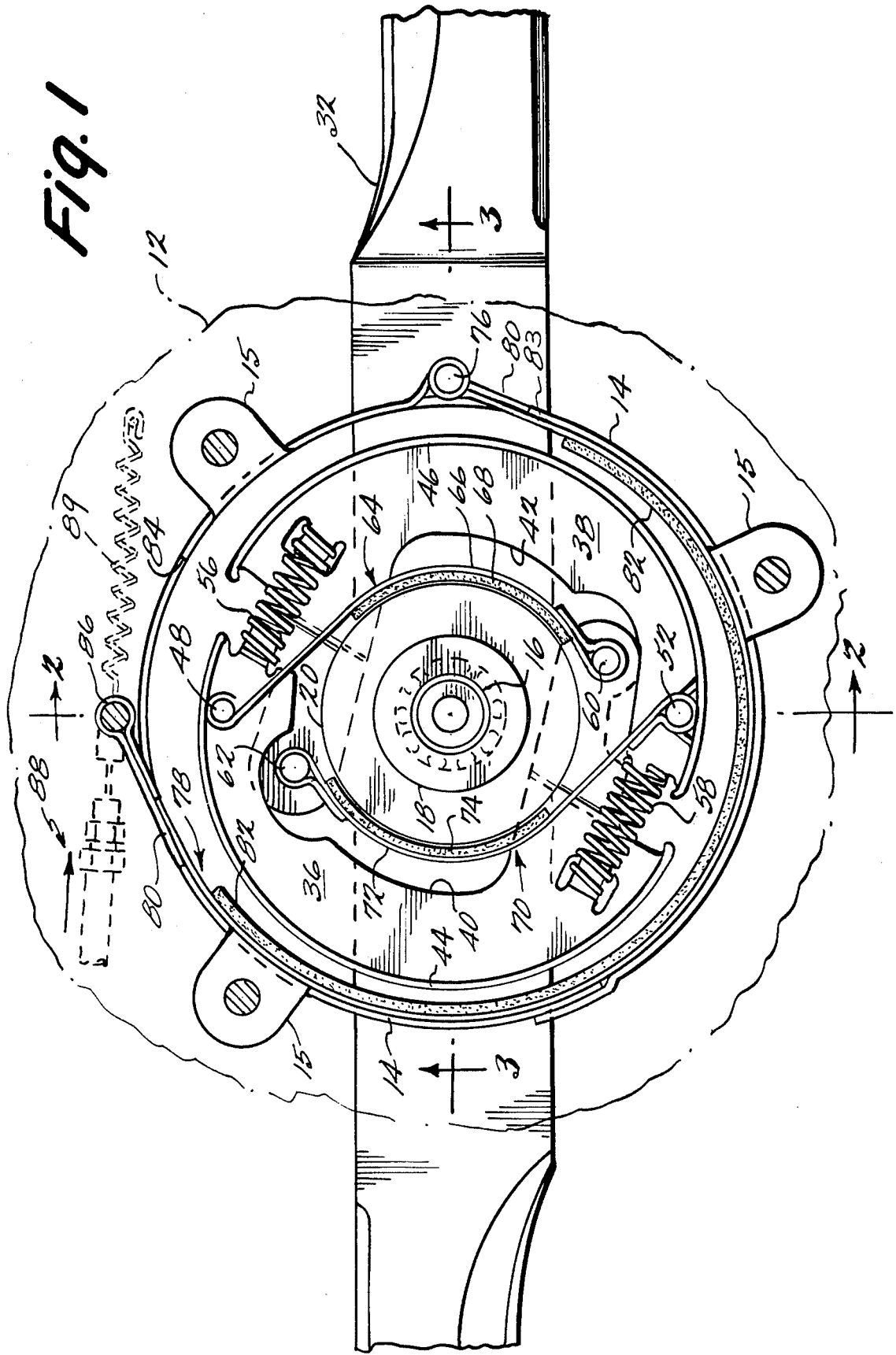
FIG. 1 is a top plan view of a preferred embodiment of a combined clutch and brake arrangement for a rotary lawnmower blade.

The free ends of shoes 36 and 38 serve to support upwardly extending posts 60 and 62, respectively, comprising projection pins welded to the shoes. A first drive band 64 extends between, and is supported by, posts 48 and 60. This band comprises a length of flexible material 66 (viz. spring steel) folded back on itself at its ends to form loops which slip over the posts. The material 66 supports a segment of wear-resistant material 68, such as is employed in brake linings, which is located adjacent the annular flange portion 20 of the drive disk 18. Similarly, posts 52 and 62 support a second drive band 70 formed in a manner identical to band 64 and comprising a length of flexible material 72 and a segment of wear-resistant material 74. The bands 64 and 70 are located on opposite sides of disk 18. Such positioning is facilitated by the ends of shoes 36 and 38 being arranged to overlap, as indicated in FIG. 1.

The exterior of casing 14 serves to support a further post 76 which in turn supports one end of a brake band 78 comprising a length of flexible material 80 (also spring steel) carrying a segment 82 of brake lining material. Band 78 passes through an opening 83 in casing 14 adjacent post 76 and extends about the inner periphery of the casing to a further opening 84. The relative positions of openings 83 and 84 is such that the segment 82 of brake lining material is positioned between casing 14 and the outer surfaces of flange portions 44 and 46. The end of band 78 opposite that joined to post 76 is secured to a movable support post 86 located outside of casing 14. The post 86 is joined to a conventional control cable arrangement, generally indicated by numeral 88 in FIGS. 1 and 3. By actuation of the control cable, the post 86 may be displaced from the position shown. A spring 89 (shown only in FIG. 1) extends between post 86 and the blade house 12 at a point thereon located on the opposite side of the post from cable 88.

The structure of the combined clutch and brake arrangement having been explained, its operation now will be described.

In the condition illustrated and with the drive shaft 16 rotating, the drive disk 18 also rotates. Since the brake lining segment 82 of the brake band 78 is not in engagement with the outer peripheries of flanges 44 and 46 of the shoes 36 and 38, respectively, the forces of springs 56 and 58 displace the shoes in a clockwise direction (as viewed in FIG. 1) about their respective pivots (posts 48 and 52). The resultant movement of posts 60 and 62 causes the drive bands 64 and 70 to be brought into engagement with the peripheral surface of the annular flange portion 20 of drive disk 18. As a consequence, rotation of the latter is translated via shoes 36 and 38, and by the posts 48 and 52, to the pan 22 causing it and the attached blade 32 to rotate. The centrifugal force imparted to shoes 36 and 38 causes further clockwise pivotal movement of the shoes about posts 48 and 52 thereby additionally increasing the frictional engagement between the rotating flange portion 20 and drive bands 64 and 70. Still further, as disk 18 rotates in engagement with the drive bands 64 and 70, the rotational movement of the disk urges the bands to wrap themselves more tightly about the disk. The combined effect of these actions is to increase the driving torque. This continues until the blade is brought up to its maximum speed.

During the clutching and accelerating operation, the flange portions 44 and 46 of shoes 36 and 38, respectively, move closer to the brake band 78. When it is desired to brake the blade, the control cable 88 is actuated in the direction indicated by the arrowhead in FIG. 1 to move post 86. Prior to actuation of the cable, spring 89 is in an extended position. Therefore, when the cable is actuated, the spring assists in drawing the segment 82 of brake lining material into contact with flange portions 44 and 46 to commence deceleration of the shoes, and thus the blade. As the brake band 78 continues to be displaced, shoes 36 and 38 are pivoted in a counterclockwise direction (as viewed in FIG. 1) against the opposing urgings of centrifugal force and the springs 56 and 58. As such counterclockwise motion continues, the braking force increases. Eventually, the drive bands 64 and 70 are separated from engagement with flange portion 20 of the drive disk 18 allowing the blade to be completely declutched and braked. Of course, by reverse actuation of the control cable 88, spring 89 is extended permitting the above-described clutching and accelerating operation to occur.

What is claimed is:

1. A combined clutch and brake arrangement for a rotary lawnmower having a source of rotational movement and a blade, said arrangement comprising:
   a drive disk joined to said source for rotation therewith;
   support means for said blade;
   at least one centrifugally movable shoe pivotally connected to said support means;
   a flexible drive band positioned adjacent to said drive disk, said band being connected at one of its ends to said shoe at a location spaced from the pivotal connection of the shoe to said support means, the other end of said band being connected to said support means at said pivotal connection whereby said drive band surrounds a portion of said drive disk;
   spring means urging said shoe about its pivotal connection to bring said drive band into frictional engagement with the periphery of the drive disk enabling translation of the rotation of the disk to said shoe, the support means and said blade, the rotation of said shoe producing centrifugal movement thereof about its pivotal connection to increase the frictional engagement of the drive band with the drive disk;
   a brake band positioned adjacent said shoe; and
   means for selectively moving said brake band into engagement with the shoe to decelerate said shoe, the support means and said blade and to displace the shoe about its pivotal connection in opposition to said centrifugal movement and the urging of the spring means to interrupt the frictional engagement of the drive band with the periphery of the drive disk.

2. A combined clutch and brake arrangement as set forth in claim 1, wherein said shoe has a generally C-shaped configuration and is arranged to surround a portion of the drive disk, the drive band surrounding the remaining portion of the disk.

3. A combined clutch and brake arrangement as set forth in claim 2, wherein the connection of the other end of said band to the support means is the pivotal connection of the shoe.

4. A combined clutch and brake arrangement for a rotary lawnmower having a source of rotational movement and a blade, said arrangement comprising:
   a drive disk joined to said source for rotation therewith;
   support means for said blade, said support means including a pan arranged substantially in a plane normal to the rotational axis of said disk;
   a pair of centrifugally movable shoes pivotally connected to said support means and positioned on opposite sides of said disk;
   a flexible drive band associated with each of said shoes, each of said bands being connected at one of its ends to the pivotal connection of its respective shoe to the support means and at its opposite end to a location on the respective shoe spaced from the pivotal connection, said bands being positioned adjacent to, and on opposite sides of, said drive disk from their respective shoes;

spring means extending between said shoes to urge the shoes about their pivotal connections to bring the drive bands into frictional engagement with the periphery of the drive disk enabling translation of the rotation of the disk to said shoes, the support means and said blade, the rotation of the shoes producing centrifugal movement thereof about the pivotal connections to increase the frictional engagement of the drive bands with the drive disk;

a brake band positioned adjacent said shoes; and means for selectively moving said brake band into engagement with the shoes to decelerate said shoes, the support means and said blade and to displace the shoes about their pivotal connections in opposition to said centrifugal movement and the urging of the spring means to interrupt the frictional engagement of the drive bands with the drive disk.

5. A combined clutch and brake arrangement as set forth in claim 4, wherein each of said shoes has a generally C-shaped configuration arranged to surround a portion of the drive disk, its associated drive band surrounding the remaining portion of the disk.

6. A combined clutch and brake arrangement as set forth in claim 4, further comprising:

bearing means positioned between said drive disk and the support means to permit relative rotation therebetween.

* * * * *